United States Patent
Johnston

(10) Patent No.: US 6,179,267 B1
(45) Date of Patent: Jan. 30, 2001

(54) BABY MIRROR

(75) Inventor: Kent E. Johnston, Birmingham, MI (US)

(73) Assignee: DaimlerChrysler Corporation, Auburn Hills, MI (US)

(*) Notice: Under 35 U.S.C. 154(b), the term of this patent shall be extended for 0 days.

(21) Appl. No.: 09/272,548

(22) Filed: Mar. 19, 1999

(51) Int. Cl.[7] ........................................ A47F 7/14
(52) U.S. Cl. ......................... 248/475.1; 248/225.11; 248/473; 359/863
(58) Field of Search .................. 248/475.1, 476, 248/473, 474, 466, 478, 479, 487, 229.16, 229.26; 362/142, 144, 135; 359/863, 854, 864; 403/76

(56) References Cited

U.S. PATENT DOCUMENTS

| | | |
|---|---|---|
| 167,585 | 9/1875 | Stephenson . |
| 1,663,672 | 3/1928 | Therasse . |
| 1,892,365 | 12/1932 | Rowan . |
| 2,146,859 | 2/1939 | Seklehner . |
| 2,197,280 | 4/1940 | Topping . |
| 2,652,648 | 9/1953 | Morley . |
| 2,856,814 | 10/1958 | Dillmann . |
| 2,880,651 | 4/1959 | Fenyo . |
| 4,359,266 | 11/1982 | Rohlf et al. . |
| 4,549,790 | 10/1985 | Harris, Jr. . |
| 4,624,539 | 11/1986 | King et al. . |
| 4,682,088 | 7/1987 | Sullivan . |
| 4,707,771 | * 11/1987 | Van Duyn et al. .................... 362/66 |
| 4,733,956 | 3/1988 | Erickson . |
| 4,775,127 | * 10/1988 | Nakamura ............................ 248/489 |
| 4,902,118 | * 2/1990 | Harris ........................... 248/475.1 X |
| 4,930,742 | * 6/1990 | Schofield et al. ................ 248/475.1 |
| 5,321,556 | * 6/1994 | Joe ..................................... 359/863 |
| 5,439,305 | * 8/1995 | Santo .................................... 403/76 |
| 5,625,500 | * 4/1997 | Ackerman ...................... 248/479 X |
| 5,964,443 | * 10/1999 | Leveille .............................. 248/478 |
| 6,039,455 | * 3/2000 | Sorenson ............................ 362/142 |
| 6,062,697 | * 5/2000 | Bryant et al. ....................... 359/841 |

* cited by examiner

*Primary Examiner*—Ramon O. Ramirez
*Assistant Examiner*—Tan Le
(74) *Attorney, Agent, or Firm*—Mark P. Calcaterra

(57) ABSTRACT

A mount for a baby mirror for viewing a baby in a baby seat placed on a back seat of a motor vehicle in a rearwardly facing position. The mount includes one of the fasteners for securing the headliner of the vehicle to a roof panel. The mirror has a housing formed with a slot in the top surface. The slot is of inverted T-shape. The slot is open at the rear of the housing to permit the head of the fastener to enter the wide portion of the slot and the shank to enter the narrow portion. The mirror housing is thus suspended from the fastener. In another embodiment, the housing has a U-shaped clip received in a groove in the housing. The legs of the clip straddle the shank of the fastener and the body of the clip is clamped between the head of the fastener and the headliner. The mirror may be detached by separating the housing from the clip and leaving the clip assembled with the fastener, or the entire housing and clip may be removed from the fastener.

5 Claims, 3 Drawing Sheets

BABY MIRROR

This invention relates generally to mirrors and more particularly to a mirror for viewing a baby in the rear of an automobile.

BACKGROUND AND SUMMARY OF THE INVENTION

The purpose of a baby mirror is to enable the driver to see a baby in a baby seat on the back seat of the vehicle. The baby seat by law or custom faces rearwardly. It is strapped to the back seat. It is impossible to see the baby by looking into the driver's rear view mirror, without the aid of a baby mirror. The baby mirror of this invention is mounted on the headliner in a position such that the driver can see the baby mirror in his own rear view mirror. With the baby mirror directed at the baby, the driver is able to see a reflection of the baby in the baby mirror by looking into the rear view mirror.

According to this invention, the housing of the baby mirror is attached to one of the fasteners used for securing the headliner to the sheet metal roof of the vehicle. The fastener has a large head. The mirror housing may have a slot of inverted generally T-shape to receive the head and shank of the fastener. The slot is open at the rear of the housing so that the fastener head and shank may enter and be frictionally held in the slot.

Alternatively, the housing may be formed with a groove to receive a generally U-shaped clip so that the clip will straddle the shank of the fastener and the body of the clip may be clamped between the head of the fastener and the headliner.

Preferably the groove is formed in a recess in the housing and extends throughout the full extent of the side and end walls of the recess. The recess is open at the rear to enable the clip to be inserted and removed. The baby mirror may be detached by removing the housing from the clip and leaving the clip attached to the headliner fastener, or by removing the housing and clip from the headliner fastener.

One object of this invention is to provide a baby mirror having the forgoing features and capabilities.

Another object is to provide a baby mirror of simple construction which is rugged and durable in use, is made of a few simple parts, and can be easily installed and removed.

These and other objects, features and advantages of the invention will become more apparent as the following description proceeds, especially when considered with the accompanying drawings.

DETAILED DESCRIPTION OF THE PREFERRED EMBODIMENTS

Figure 1:
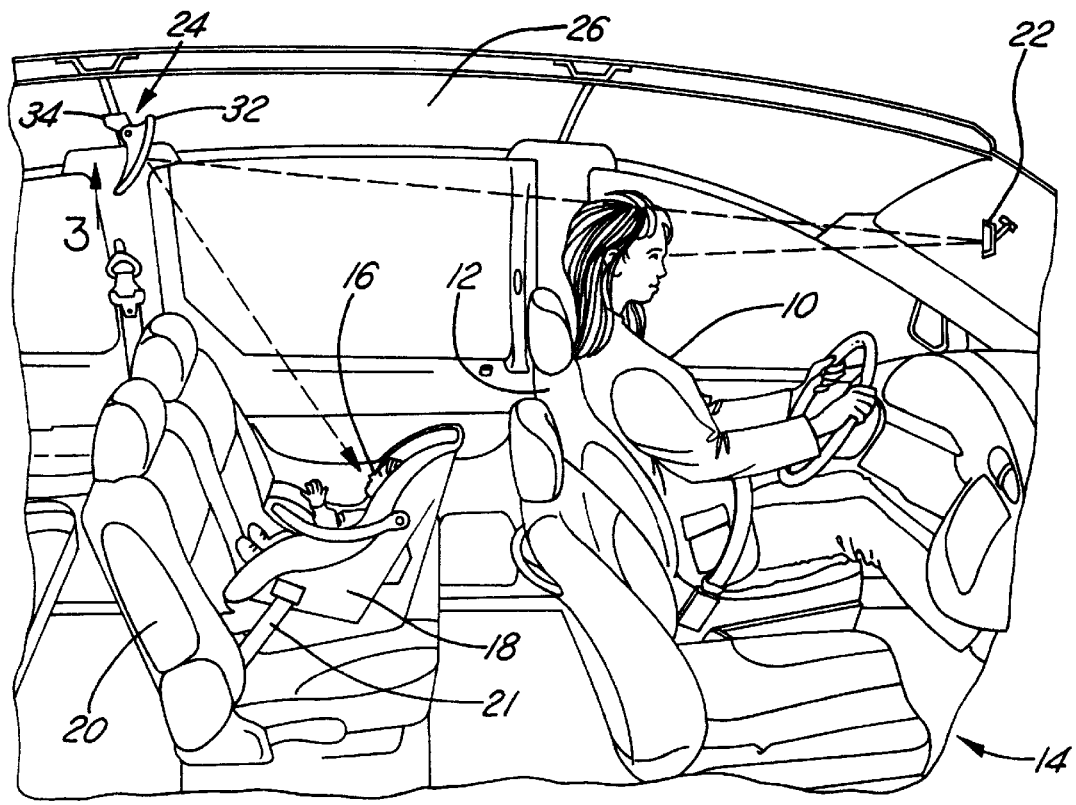
FIG. 1 is a perspective view of the inside of a motor vehicle showing the baby mirror of this invention installed on the headliner of the vehicle.
Figure 2:
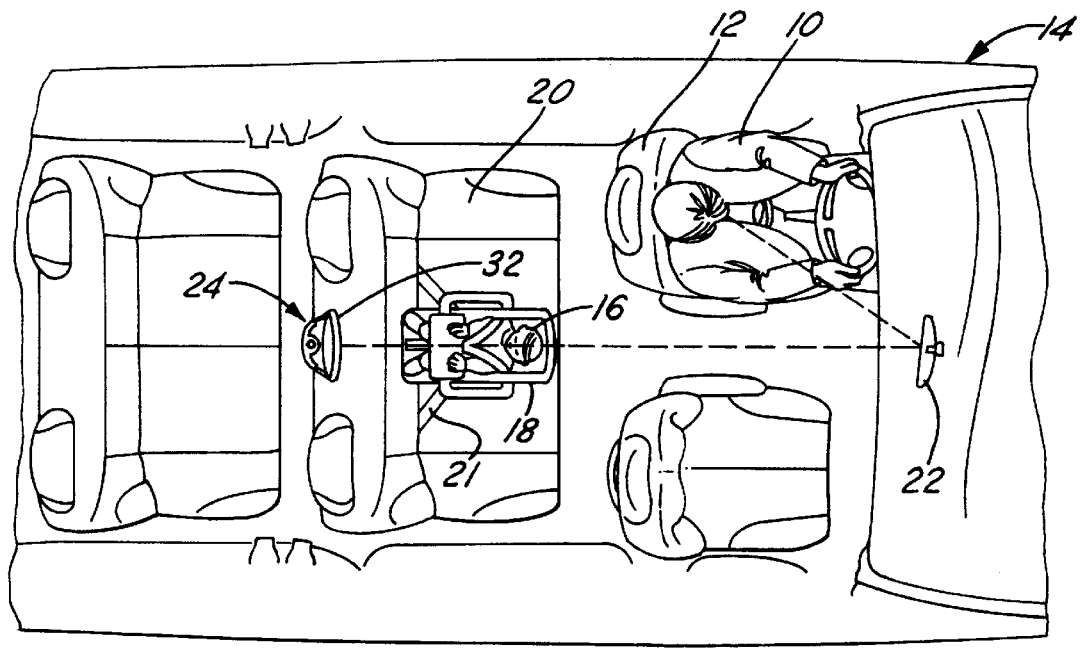
FIG. 2 is a view of the structure shown in FIG. 1 as viewed from above, and with the roof of the vehicle removed.
Figure 3:
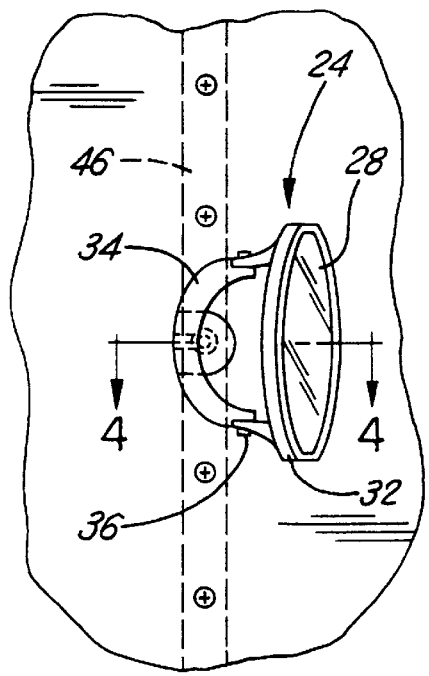
FIG. 3 is a fragmentary view of the baby mirror shown attached to the headliner of the vehicle as seen from below.

Referring now more particularly to the drawings, FIGS. 1 and 2 show a driver 10 in the drivers seat 12 inside a motor vehicle 14, a baby 16 in a baby seat 18 secured on the back seat 20 in a rearwardly facing position by belts 21, and the usual rear view mirror 22 mounted in front of the driver on or above the windshield. It is impossible for the driver to see the rearwardly facing baby even using the rear view mirror 22, without the baby mirror 24 of this invention which is shown mounted on the headliner 26.

The baby mirror 24 includes a reflecting element 28 (the mirror proper) supported in a frame 32. The frame 32 is connected to a support or housing 34 by a pivot 36. The pivot frictionally holds the mirror in an angularly adjusted position.

Figure 6:
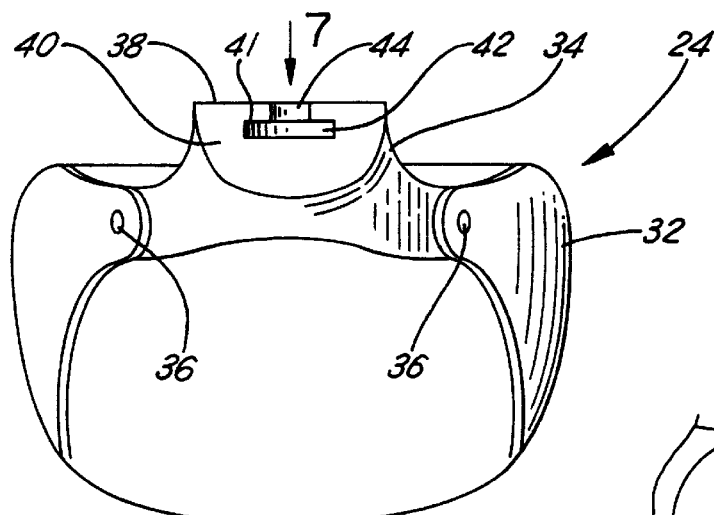
FIG. 6 is a view of the mirror as seen from the rear.
Figure 7:
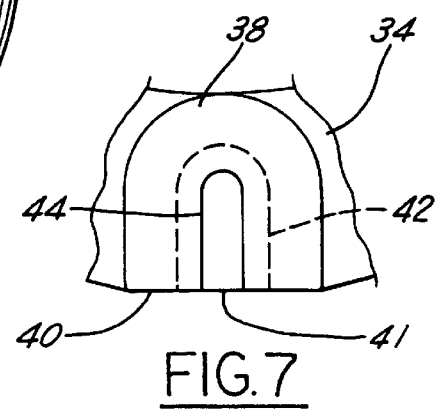
FIG. 7 is a fragmentary view looking in the direction of the arrow 7 in FIG. 6.

The housing 34 has a flat horizontal top surface 38 and a flat vertical rear surface 40. A horizontal slot 41 in the top surface extends from the rear surface 40 where the slot is open, to the front of the slot where it is closed (FIG. 7). The slot 41 is of inverted T-shape in cross section (FIG. 6) having a broad lower portion 42 and an narrow upper portion 44 which opens through the top surface 38.

The baby mirror is adapted to be attached to the headliner 26 of the vehicle. The headliner is secured to the sheet metal framing 46 of the roof of the vehicle by several fasteners, including a fastener 48. The fastener 48 has a cylindrical shank 50 and a large circular head 52 extending across the lower end of the shank. The shank adjacent its upper end is shaped like a Christmas tree with barbs 53 permitting it to be pressed through the headliner and into the framing 46 but preventing withdrawal. The fastener 48 is of special construction having a cylindrical shank extension 54 extend downward below the head 52 and an extension head 56 spaced beneath the head 52. The shank extension 54 is slightly narrower than the narrow portion 44 of the T-shaped slot. The head 56 of the shank extension is wider than the narrow portion 44 of the T-shaped slot but slightly narrower than the wide portion 42 of the T-shaped slot.

The sides of the lower portion 42 of the slot are parallel and the sides of the upper portion 44 of the slot are parallel. The front of the upper and lower portions of the slot are arcuate to match the shape of the shank extension 54 and head 56 of the fastener 48.

The portions of the housing above the broad portion 42 of the slot provide an integral attaching portion 57 which cooperates with the fastener head 56 in suspending and securing the baby mirror to the headliner. The portions of the housing on opposite sides of the upper narrow portion 44 of the slot straddle the shank extension 54 and provide supporting laterally spaced elements 59 resting on the head 56. These supporting elements are held frictionally between the heads 52 and 56.

Figure 4:
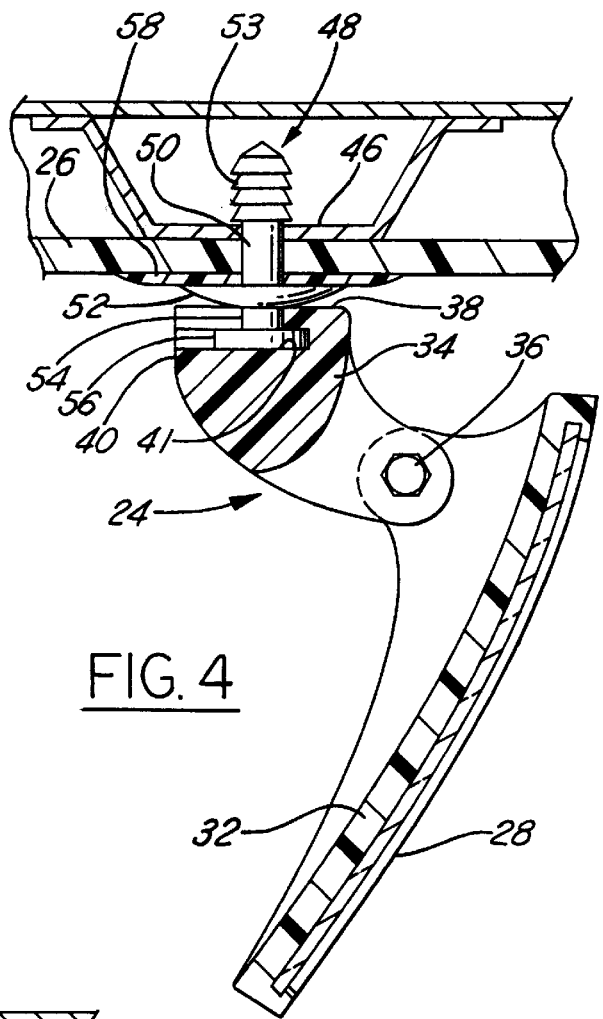
FIG. 4 is a section view taken on the line 4—4 in FIG. 3.
Figure 5:
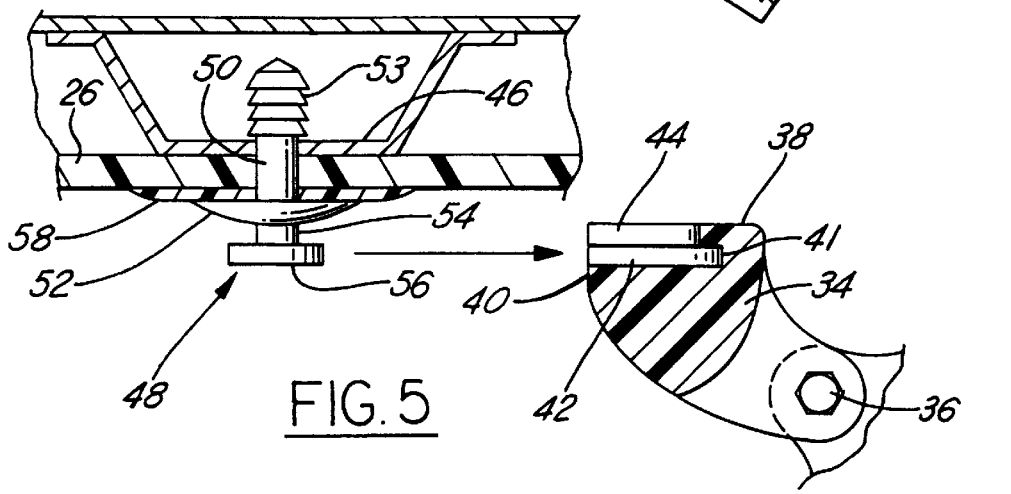
FIG. 5 is a fragmentary sectional view of the structure shown in FIG. 4, but with the mirror separated from the headliner fastener.

The manner of attaching the mount or housing of the mirror to the headliner will be clear from FIGS. 4 and 5, FIG. 5 showing the parts before attachment and FIG. 4 showing the relationship of the parts after the housing 34 has been moved toward the fastener so that the shank extension 54 extends into the narrow portion 44 of the slot through the open rear of the housing and the extension head 56 extends into the wide portion of the slot.

The dimensions of the parts are such that there is a frictional engagement between the top surface 38 of the housing 34 and the fastener head 52 as seen in FIG. 4. Hence the mirror will not accidently become separated from the fastener. However, with forward pressure applied manually to the housing, to the right in FIG. 4, the friction may be overcome and the housing easily separated from the fastener.

Preferably, but not necessarily, a large washer 58 may be sleeved on the shank 50 of the fastener to separate the head 52 from the headliner 26.

Figure 8:
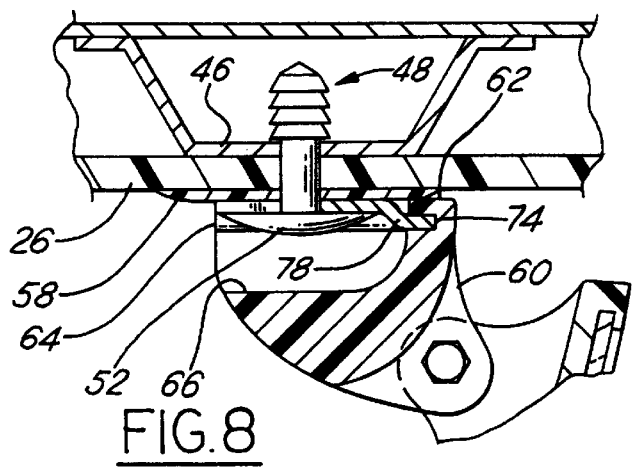
FIG. 8 is a view similar to a portion of FIG. 4, but showing a modification.
Figure 9:
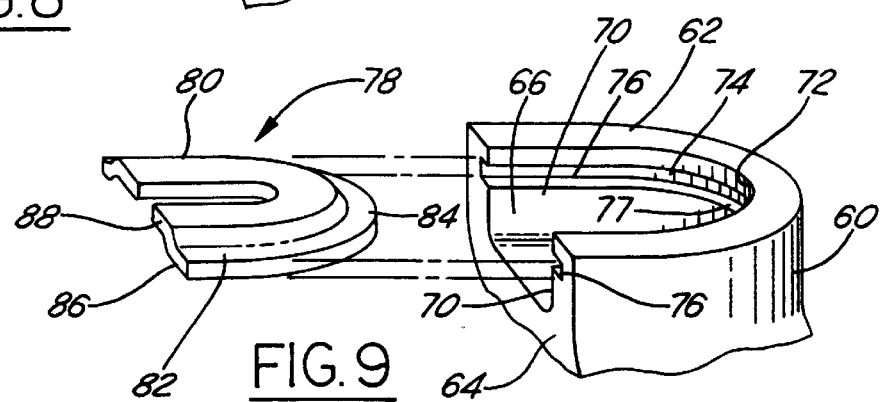
FIG. 9 is a perspective view of a portion of the modification, showing the housing for the baby mirror separated from the clip.

FIGS. 8 and 9 show a modification in which the housing 60 has a flat horizontal top surface 62 and a flat vertical rear face 64. A large recess 66 opens through the top surface 62 and the rear face 64. This large recess is generally U-shaped in horizontal section, having the laterally spaced, parallel side walls 70 connected at the front by an arcuate front wall 72. Formed in the recess along the side and front walls thereof is a continuous U-shaped groove 74, both ends of which extend into and through the rear face 64 of the housing. The groove is horizontal and has laterally spaced parallel groove segments 76 and an arcuate front segment 77. The groove is spaced beneath the top surface 62 a predetermined distance as shown.

Included in this modification is a generally U-shaped clip 78. The clip has a body formed with laterally spaced legs 80 and 82 connected by an arcuate front portion 84 curved to match the curvature of the front groove segment 77. The clip has a U-shaped laterally outer edge portion 86 and a U-shaped laterally inner edge portion 88 which is spaced slightly above the laterally outer edge portion. The distance between the laterally outer edges of the legs 80 and 82 of the clip is substantially equal to the distance between the laterally inwardly facing bottoms of the groove segments 76 so that the clip will fit nicely in the groove with its opposite side edges frictionally received in the groove segments 76 and the front edge of its arcuate front portion 84 frictionally received in the front portion 77 of the groove. In other words, the entire outer periphery of the clip is closely and frictionally received in the groove throughout the length of the groove. The clip may be installed in or removed from the groove 74 by manual pressure. The legs 80 and 82 of the clip provide supporting elements for the mirror.

When the clip 78 is inserted into the groove, its inner edge portion 88 is substantially flush with the top surface 62 of the housing. There is enough space in the recess beneath the clip to accommodate the head 52 of the fastener 48. The fastener in this instance is a fastener of conventional construction and is like the fastener shown in the first embodiment except that it does not have the shank extension and shank extension head.

The clip 78 is installed in the housing groove 74 in the manner shown in FIG. 9 and when thus installed the clip and housing can be assembled with the fastener by a rearward movement. A washer 58 may also be used in this embodiment. It will be understood that the distance between the legs 80 and 82 of the fastener is somewhat greater than the width of the shank 50 of the fastener but less than the width of the head of the fastener so that when assembled on the fastener the legs straddle the shank and the clip is suspended on the fastener head. The body of the clip 78 is clamped between the head 52 of the fastener and the washer 58 (or with the headliner 26 if the washer is omitted). This prevents accidental removal of the clip 78 and housing 60, although with manual pressure in a forward direction, that is to the right in FIG. 8, the clip and housing can be easily separated from the fastener. It should be understood that the housing 60 may be removed, leaving the clip 78 in position on the fastener, or the entire unit including the housing and the clip may be removed from the fastener. The clip in this embodiment provides an attaching means separate from the housing which cooperates with the fastener head 52 in securing the baby mirror.

What is claimed is:

1. A mount for a baby mirror for viewing a baby in a baby seat placed on a passenger seat behind a front seat of a motor vehicle in a rearwardly facing position, said mount comprising:

a fastener for securing a headliner of the vehicle to a roof panel thereof. said fastener having a head and a shank extending upwardly from the head and adapted to extend through the headliner and into the roof panel. a support for the mirror, said support including an attaching portion, said fastener being adapted to engage said attaching portion to support said mount and said mirror, wherein said attaching portion has laterally spaced supporting elements and said attaching portion is adapted to be suspended from the head of the fastener with the supporting elements straddling the shank of the fastener, wherein said attaching portion is an integral part of said support and formed of one piece therewith, and wherein said support includes a housing, said housing having a top surface, a slot in said housing beneath said top surface, said slot being of inverted T-shape having a wide bottom portion and a narrow top portion extending upwardly through said top surface , said housing has a rear surface, said slot being open through the rear surface of said housing to permit the head of the fastener to enter into the wide portion of said slot and the shank to enter the narrow portion thereof.

2. A mount according to claim 1, wherein said fastener has an intermediate head above the first mentioned head, said supporting elements being frictionally held between said heads.

3. A mount for a baby mirror for viewing a baby in a baby seat placed on a passenger seat behind a front seat of a motor vehicle in a rearwardly facing position, said mount comprising:

a fastener for securing a headliner of the vehicle to a roof panel thereof, said fastener having a head and a shank extending upwardly from the head and adapted to extend through the headliner and into the roof panel, a support for the mirror, said support including a U-shaped clip having a body formed with laterally spaced legs, said clip being adapted to be attached to said fastener with the legs straddling the shank of the fastener and the body of the clip clamped between the head of the fastener and the headliner, wherein said support includes a housing, and further including means attaching said clip to said housing, and wherein said housing has a top surface, a recess having laterally spaced side walls and an open rear, groove retainer means for retaining the clip in said recess, said groove retainer means comprising side groove segments in the respective side walls of said recess, and said clip having opposite side edges slidably received in said respective side groove segments, said clip being insertable into and removable from said side groove segments through the open rear of said housing, and said recess including space beneath said groove segments for clearing the head of the fastener.

4. A mount according to claim 3, wherein said recess has a front wall connecting said side walls, said groove retainer means includes a front groove segment in said rear wall, said front groove segment connecting said side groove segments to provide a single continuous generally U-shaped groove, and said clip has an outer front edge portion received in said front groove segment when said clip is fully inserted in said side groove segments.

5. A mount according to claim 4, wherein said U-shaped groove is spaced beneath the top surface of said housing, and said clip has U-shaped inner side and rear edge portions disposed above U-shaped outer side and rear edge portions thereof in a plane substantial level with the top surface of said housing.

* * * * *